May 15, 1962  F. H. VESELY  3,034,545
BOWLING PIN CUTTING MECHANISM FOR LATHES
Filed July 15, 1959  3 Sheets-Sheet 1

INVENTOR
Frank H. Vesely
BY
ATTORNEY

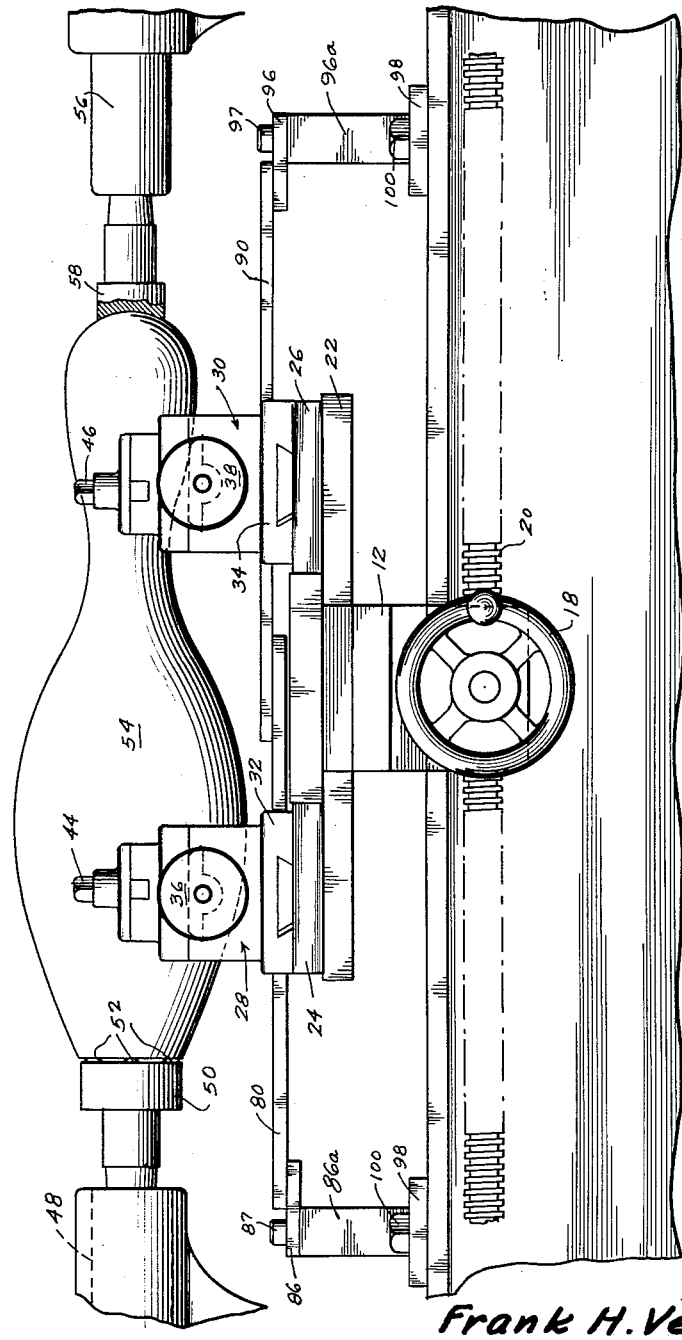

May 15, 1962 F. H. VESELY 3,034,545
BOWLING PIN CUTTING MECHANISM FOR LATHES
Filed July 15, 1959 3 Sheets-Sheet 3
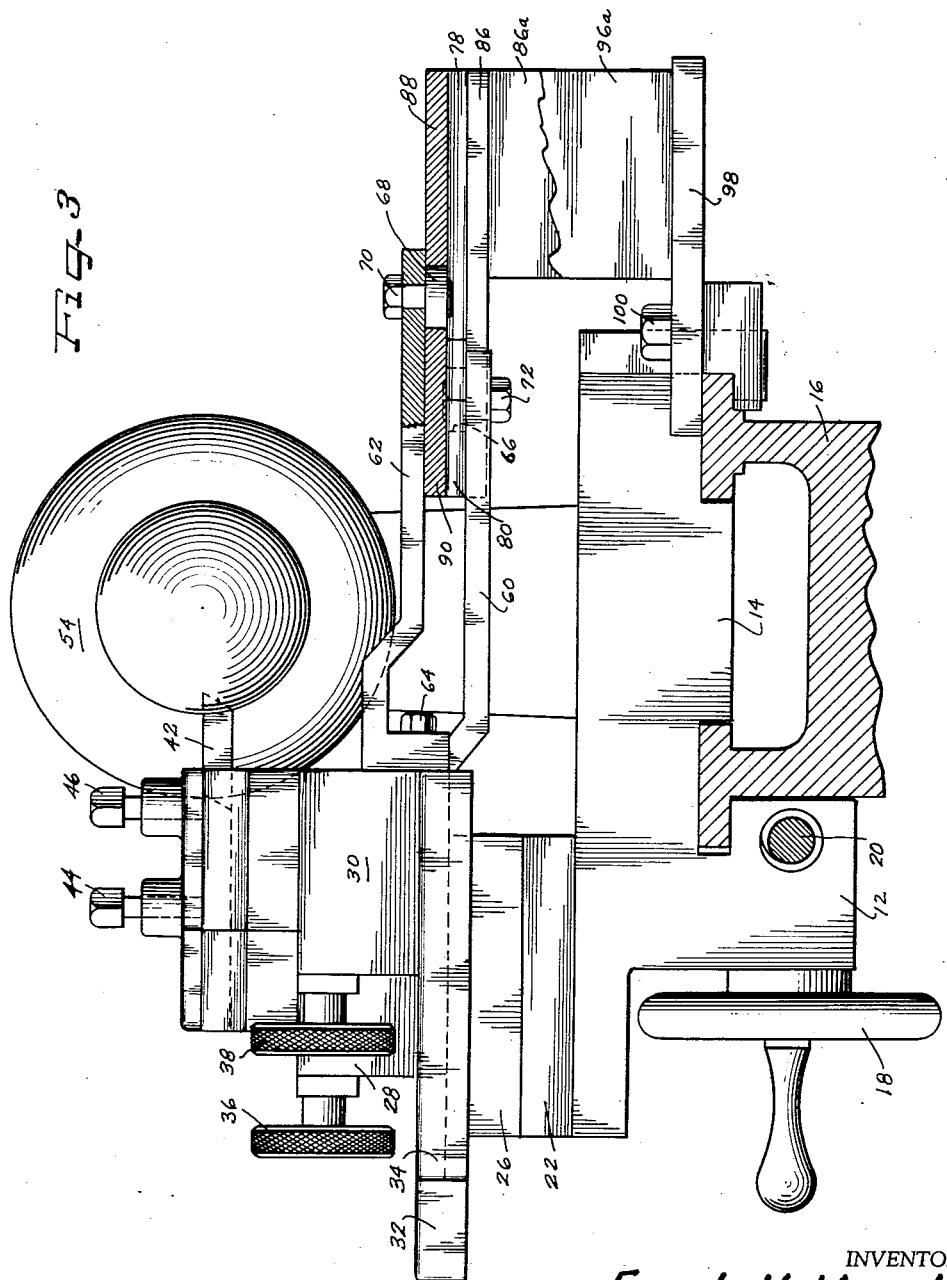
INVENTOR
*Frank H. Vesely*
BY
ATTORNEYS United States Patent Office 3,034,545
Patented May 15, 1962

3,034,545
BOWLING PIN CUTTING MECHANISM
FOR LATHES
Frank H. Vesely, 1840 S. Ridgeland Ave., Berwyn, Ill.
Filed July 15, 1959, Ser. No. 827,235
2 Claims. (Cl. 142—47)

This invention relates to a bowling pin cutting mechanism for lathes and more particularly to a two track cutting mechanism for removing the varnish on a bowling pin to prepare it for refinishing.

Heretofore, bowling pin cutting mechanisms for lathes have required considerable skill in their operation, with a consequent high labor cost, and have also entailed a considerable expenditure of time for each cutting operation. The bed carrying the cutters was backed away from the cutting area by hand to permit removal and replacement of pins and was then moved back into operative position. The two cutters were both set by hand and the cutter for the upper portion of the pin had to touch the pin. Only one track was provided for both cutters. Despite the exercise of a high degree of care, unevennesses developed at the overlap between the cutting areas of the cutters and the individual cutters were apt to vary in their cutting action from one operation to the next.

The present invention overcomes the aforementioned difficulties and affords a substantially automatic cutting action wherein uniformity is provided in the thickness of cut for successive operations. The overlap between the areas cut by the respective cutters is rendered smooth and continuous and the entire operation can be accomplished in but a fraction of the time previously required and with a great reduction in expense both with respect to the time consumed and the quality of skill required.

In overcoming the problem of removing the bed carrying the cutters from the cutting area for successive operations, provision is made for maintaining both of the cutters in spaced relation to the cutting area without moving the bed. This is accomplished by the construction of the track means for the cutters and instead of the single track construction previously provided for the two cutters, a separate track is provided for each of the cutters wherein the initial and terminal positions of the cutters with respect to the tracks are such that the cutters are held away from the pin. Thus a finished pin may be removed and a new pin may be inserted in the lathe without time consuming resetting being required. As the bed is then caused to travel along the length of the lathe, by the conventional worm gear, the cutters are automatically carried into precisely calibrated engagement with the pin and traverse the pin for a distance such that an even and smooth overlap is provided between the cutting areas of the first and second cutters. Since the tracks are permanently aligned, there is no need for backing off the cutters and then resetting them for each cutting operation as is done with cutting mechanisms now in use.

One of the tracks is disposed slightly below the other of the tracks and parallel thereto, as positioned by suitable support means. Desirably the inner ends of the tracks are secured to one another for this purpose. The tracks thus overlap in the area corresponding to the central portions of the pin and the track for the cutter engaging the base of the pin is configured so that the cutter will back away from the pin in a smooth curve in the area of the overlap, thus leaving no trace of the overlapping cut made by the other cutter.

Accordingly, it is an object of the present invention to provide a cutting device for bowling pins wherein substantially automatic operation is afforded without the necessity for backing off the bed carrying the cutters at each successive operation.

Another object of the invention is to provide a bowling pin cutting mechanism for lathes wherein two tracks are permanently positioned on the lathe with their inner portions overlapping, so that a calibrated cutting action is automatically afforded for successive operations.

Another object of the invention is to provide a track construction as described wherein the tracks are dimensioned and configured so that at the initial position of the cutters, prior to a cutting operation, the cutters are spaced from the pin and thereafter move into cutting relationship therewith.

Another object of the invention is to provide a construction as described wherein the cutters are moved away from the pin at the conclusion of their cutting operations so that the pin may be easily removed and the cutters carried back to the starting position without the necessity for resetting thereof.

Other objects and advantages of the invention will become apparent as the description proceeds in accordance with the drawings in which:

FIGURE 2 is a side elevational view of the structure shown in FIGURE 1; and

FIGURE 3 is a view taken along the lines III—III of FIGURE 1.

Figure 1:
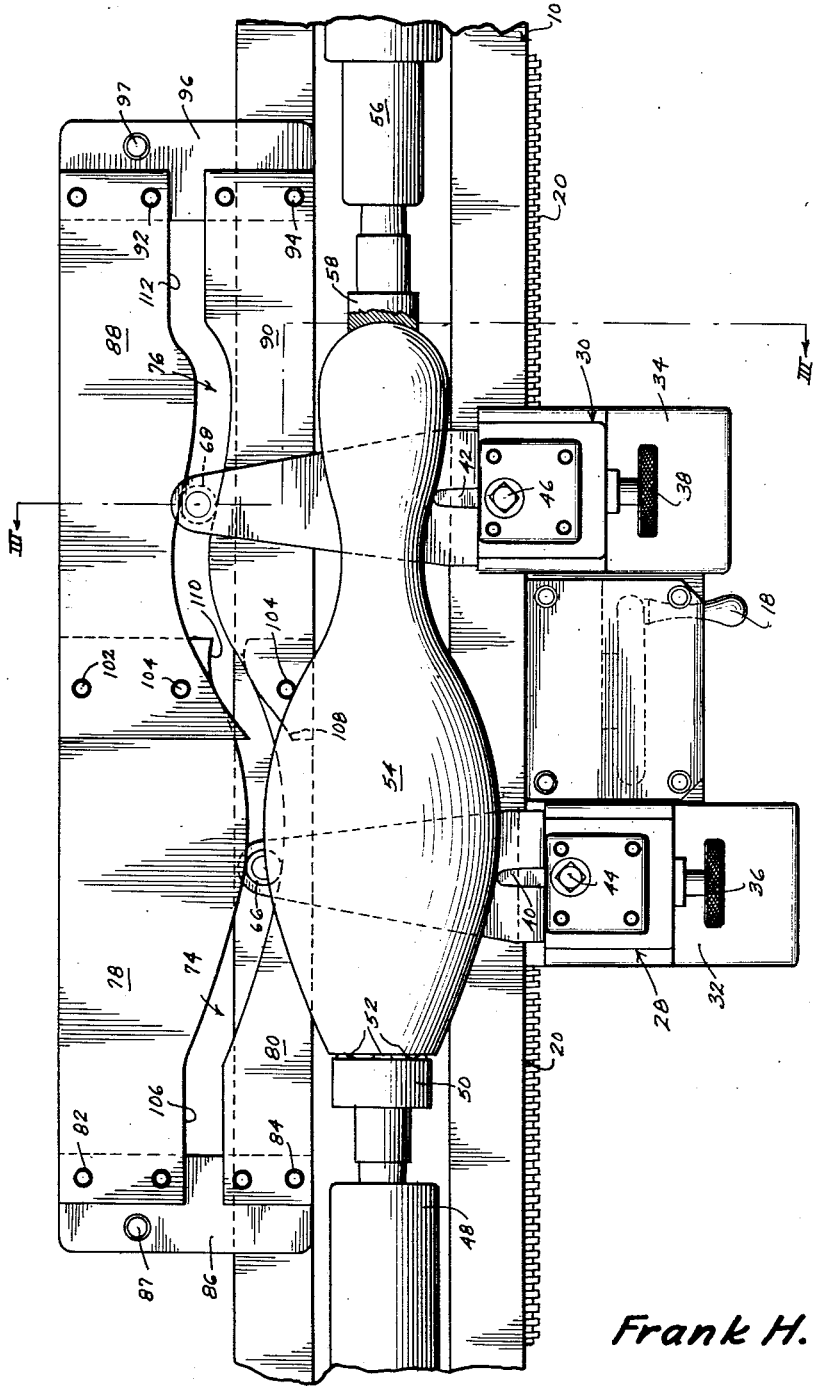
FIGURE 1 is a top plan view of a bowling pin cutting mechanism for lathes in accordance with the invention.

Referring now to the drawings, a bowling pin cutting mechanism is shown for use with a lathe 10 comprising a bed 12 having a guide 14 carried in slidable relationship in a lathe bed 16. Manually rotatable wheel means 18 move the bed 12 along a worm shaft 20, in accordance with the understanding of those skilled in the art, although suitable controls for automatic operation, such as means for stopping the progress of the bed at the termination of the cutting operation and means to return the bed to an initial position may also be provided.

The bed 12 carries a support table 22 on which are formed guide blocks 24 and 26 for carrying cutter means 28 and 30. The cutter means include slides 32 and 34 whose position on the blocks 24 and 26 is determined by track means according to the invention as hereinafter described and manually operable controls 36 and 38 for cutter blades 40 and 42 are held by bolts or the like 44 and 46.

The lathe 10 includes a driving member 48 powered by suitable means (not shown) and having a head 50 carrying projections or the like 52 for engagement with the base of a bowling pin 54. A support member 56 of the lathe 10 carries a head 58 which is shaped to hold the top end of the pin 54 in snug-fitting relationship as shown. Thus the pin may be turned in the usual manner to remove varnish from the external surfaces thereof by the action of the cutter means 28 and 30, as the bed 12 travels along the worm shaft 20.

In accordance with the invention, control means for the cutter means 28 and 30 are provided which include brackets 60 and 62 secured to the cutter means by suitable bolts, indicated by reference numeral 64 in FIGURE 3. The brackets 60 and 62 are preferably constructed to extend in substantial parallelism as shown.

Cam followers 66 and 68 are journalled to the brackets 60 and 62 by suitable means 70 and 72 or the like so as to extend in opposite directions and toward one another. In order to guide the cam followers 66 and 68 so that the cutter means 28 and 30 are directed along a path which corresponds to the shape of the pin 54, a pair of tracks 74 and 76 are provided which afford exceptional advantages in smoothness of machining and the elimination of waste motion. The tracks 74 and 76 are positioned in vertically offset relationship such as to respectively receive the cam followers 66 and 68 and provide separate cam tracks for the cam followers. Thus the track 74 is formed by horizontal plates 78 and 80, the outer ends of which are secured by bolts or the like 82 and 84 to a support block 86. The track 76 is formed of similar plates 88 and 90 which are likewise secured by bolting or the like 92 and 94 to a support block 96, the support blocks 86 and 96 being fastened to uprights 86a and 96a by bolts 87 and 97 and secured to the lathe bed 16 by suitable flange means and bolt means 98 and 100. The inner portions of the plates 78 and 80 and 88 and 90 are secured to one another by fastening means 102 and 104 at their inner ends so that they overlap to a predetermined extent as hereinafter described.

The track 74 generally is accurately calibrated to conform to the edge of the base of the pin 54 opposite thereto. Likewise, the track 76 is calibrated to conform to the upper portion of the pin and to that portion opposite the track. However, the tracks 74 and 76 include means for maintaining the cutter means 28 and 30 out of engagement with the pin 54 initially including a relatively straight portion 106 extending for a predetermined interval preferably parallel to the axis of the pin and continuous with the track 74 so as to maintain cutter means 28 out of contact with the pin at the beginning of its travel. Likewise, the track 76 is deflected inwardly at 108 relative to the surface of the pin 54 opposite thereto so that the cutter means 30 is maintained out of contact with the follower for a predetermined interval. Accordingly, a pin can be placed in the lathe 10 without any interference from the cutter.

The terminal portion of the track 74, within the area of overlap with the track 76, provides means for moving the cutting means 28 away from the pin in a smooth, continuous path such as to eliminate any unevenness or discontinuity with the portions cut by the cutting means 30 at the initial cutting phases thereof. The means for thus moving the cutter means 28 away from the pin at the conclusion of its cutting action comprises a track portion 110 immediately beneath the track 76 having a point of deflection in the area of overlap and a radius of curvature opposite to the curvature of the main portion of the path 74 which corresponds to the base of the pin 54. Thus the track portion 110 provides a reverse curve in the direction of the pin so that at the end of its travel, the cutter means 28 is disposed in spaced relation to the pin. Pneumatic stop means (not shown) may be used to terminate the movement of the bed 12 and the cutter means 28 and 30, as previously described.

Means for maintaining the cutting means 30 out of contact with the pin 54 at the end of the cutting operation are likewise provided, comprising a track section 112 continuous with the track 76. Thus the track 76 continues generally in an outline complementary to the outline of the upper portion of the pin, but is deflected axially outwardly so that cutting action terminates just short of the top of the pin, whereby the cutting means 30 is both moved laterally relative to the topmost surfaces of the pin and axially outwardly therefrom. At the conclusion of its travel, therefore, the cutter means 30 is maintained in spaced relation to the pin so that removal of the pin is easily accomplished, the cutter means 28 being similarly spaced from the pin at the same time, as stated. The cutters 28 and 30 may then be returned to the track portions 106 and 108, respectively as by hand operated means 18, or otherwise, and another pin placed in the lathe for finishing as described.

There has thus been provided an extremely simple and highly accurate means for removing varnish from a bowling pin, which is suitable for affording a continuous and even cut without the need for manually moving the bed and the cutters away from the pin at the conclusion of each operation and thereafter resetting the cutters. And although the invention has been illustrated with respect to a bowling pin, it will be appreciated that it is suitable for a wide range of applications involving inversely related curvatures in objects to be processed in a lathe.

Although I have herein set forth and described my invention with respect to certain specific principles and details thereof, it will be understood by those skilled in the art that these may be varied without departing from the spirit and scope of the invention as set forth in the hereunto appended claims.

I claim as my invention:

1. A cutting mechanism for use with a lathe for bowling pins or the like comprising a pair of cutters, a bed supporting said cutters for slidable movement toward and away from the lathe axis, means for moving the bed axially of the lathe, a track for each of said cutters and a follower connecting each of the cutters with its track, said tracks including means for maintaining said cutters in spaced relation to an object to be cut during an initial portion of their movement along said tracks, and means for maintaining said cutters in spaced relation to the object to be cut during a terminal portion of their movement along said tracks.

2. In combination with a lathe for cutting bowling pins or the like, a pair of cutters, a bed slidably supporting said cutters for movement toward and away from an object on the lathe, means for moving the bed and the cutters along the longitudinal axis of the lathe and a track for each of the cutters fixedly mounted on said lathe and providing in combination an outline of the object to be cut, said tracks overlapping at their inner portions and configured at the area of overlap thereof to provide a smooth juncture in the cutting operations guided thereby, and follower means connecting each of said tracks to one of said cutters, said tracks being aligned in parallel relationship to permit the follower means for one of said tracks to pass the other of the tracks in the area of overlap, said tracks each being formed of a pair of coplanar plates having complementary inner edges defining guide grooves with adjacent plates for the respective tracks being joined at said area of overlap.

References Cited in the file of this patent

UNITED STATES PATENTS

| | | |
|---|---|---|
| 2,316,405 | Clausen | Apr. 13, 1943 |
| 2,502,268 | Moss | Mar. 28, 1950 |
| 2,622,635 | Mason | Dec. 23, 1952 |